3,763,142
THIAZOLODIAZEPINES
Robert E. Manning, Mountain Lakes, N.J., assignor to Sandoz-Wander, Inc., Hanover, N.J.
No Drawing. Continuation-in-part of application Ser. No. 151,391, July 12, 1971, which is a continuation-in-part of application Ser. No. 715,493, Mar. 25, 1968, both now abandoned. This application Nov. 9, 1971, Ser. No. 197,115
Int. Cl. A61k 27/00; C07d 53/00, 99/10
U.S. Cl. 260—239 BC
7 Claims

ABSTRACT OF THE DISCLOSURE

Thiazolodiazepines; e.g., 3-hydroxy-3-phenyl-2,3,5,6,7,8-hexahydro-thiazolo[3,2-a][1,3]diazepine hydrobromide are useful as anti-depressants and anoretics.

This application is a continuation-in-part of copending U.S. patent application Ser. No. 151,391, filed July 12, 1971, now abandoned which in turn is a continuation-in-part of U.S. patent application, Ser. No. 715,493 filed Mar. 25, 1968, now abandoned.

This invention relates to novel heterocyclic compounds. More specifically it relates to novel 3-phenyl and 3-substituted phenyl 5,6,7,8-tetrahydro-thiazolo[3,2-a][1,3]diazepines, intermediates therefor, acid addition salts thereof and processes for their preparation.

The thiazoldiazepines of the present invention may be represented by the formula:

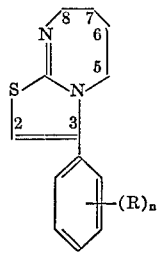
(I)

where $n=0$, 1 or 2;

R is halogen having an aromatic weight of 19 to 36, phenyl, trifluoromethyl or lower alkoxy, i.e., alkoxy having 1 to 4 carbon atoms, e.g., methoxy, ethoxy, etc., with the proviso that two trifluoromethyl groups are not on adjacent carbons, and pharmaceutically acceptable acid addition salts thereof.

The process for preparing compounds of Formula I may be represented as follows:

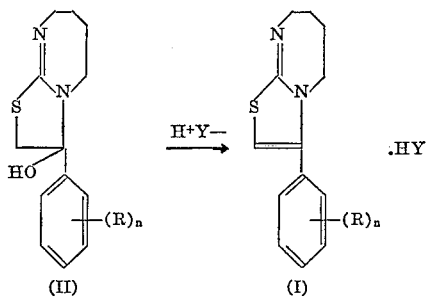

where $n$, R and the proviso are as set out above, and
Y is an anion of a mineral acid or an organic acid.

The diazepines of Formula I are prepared from the compounds of Formula II or the acid addition form thereof by treatment with a mineral or organic acid at a temperature from about room temperature to about 125° C., preferably 50° C. to 70° C. Mineral acids, such as hydrochloric acid, sulfuric acid, phosphoric acid and the like may be utilized as may organic acids; such as acetic acid; but the mineral acids in concentrated form are preferred. The reaction may be performed in solvent but use of solvent and the particular solvent utilized is not considered critical. As illustrative of the solvents which may be used there may be mentioned lower alkanols such as ethanol, isopropanol and the like, acetone, tetrahydrofuran, and similar inert solvents.

Alternatively, the reaction may be carried out simply by heating the compound of Formula II, in acid addition salt form in an inert solvent. The reaction is preferably carried out at temperature of from about 50° to 125° C., especially 80° to 100° C. The preferred inert solvents are lower alkanols, acetone, diethyl ether, tetrahydrofuran and especially the lower alkanols, in particular ethanol.

The compounds of Formula I in base form are prepared from the salt form of the compounds of Formula I by conventional methods such as by suspending the salt in water and adding sodium carbonate.

Compounds of Formula II may be prepared in accordance with the following reaction scheme:

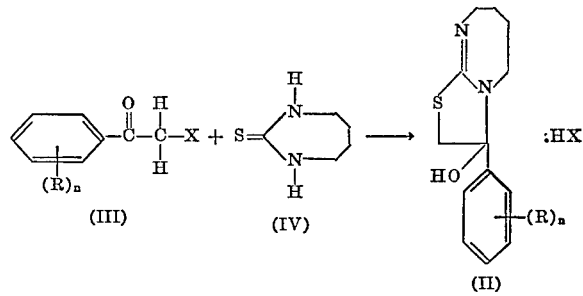

where $n$, R, X and the proviso are set out above.

The compounds of Formula II above are prepared by treating a phenacyl halide (III), e.g. p-chlorophenacyl bromide, with tetramethylenethiourea (IV) in solvent at a temperature of about 0° C. to 50° C. Preferred temperatures are about 10° C. to 35° C. The solvents which may be used include acetone, lower alkanols such as ethanol, tetrahydrofuran and the like, although the particular solvents and temperatures used are not critical.

Compounds of Formula II may also be prepared by treating a compound of the formula:

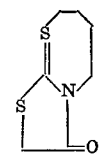
(V)

with compounds respectively of the formula:

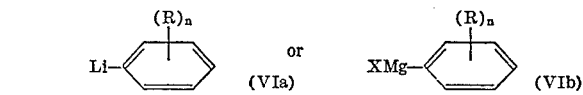

in which $n$, X, R and the proviso are as defined above.

The process is carried out by treating a compound of Formula V with a compound of Formula VIa or VIb in an inert solvent, such as ethers, e.g., diethyl ether or tetrahydrofuran, in an inert atmosphere, for instance under nitrogen gas, at a temperature of about 0° to 50° C., preferably room temperature. The reaction may be carried out for about 3 to 24 hours for optimum results. Neither the solvent nor the temperature is critical. The product is isolated by convntional hydrolysis techniques, e.g., by treating the reaction mixture with saturated ammonium chloride solution at a pH of about 6 to 8 and a temperature of about −10° to +20° C.

Compounds (II) may also be obtained by treating a compound of the formula:

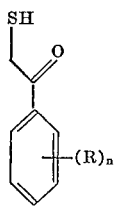

(VII)

with a compound of the formula:

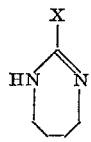

(VIII)

in which $n$, X, R and the proviso are as defined above.

Compounds of Formula II are prepared according to the above process by treating a compound of Formula VII with a compound of the Formula VIII in inert solvent, for example, an alkanol having 1–4 carbon atoms, such as ethanol or isopropanol, at a temperature of about 10° to 40° C., conveniently around room temperature. The reaction may be performed for about 12 to 48 hours in order to obtain the product (II). Neither the solvent nor the temperature is critical.

The compounds of Formula II may also be obtained by treating a compound of the formula:

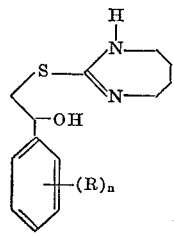

(IX)

or an acid addition salt thereof with activated manganese dioxide where $n$, R, and the proviso are as defined above.

This process is carried out by treating a compound (IX) or an acid addition salt thereof with activated manganese dioxide in an inert solvent, e.g., halogenated hydrocarbon solvents such as $CHCl_3$ or $CH_2Cl_2$ at a temperature below about 30° C. The temperature of the reaction may range from about 0° to 30° C., preferably about 20° to 30° C. For optimum results, the reaction is carried out for about 12 to 60 hours.

As indicated above, the compounds of Formula II above may be recovered in the form of their acid addition salts, and when it is desired to convert such salts to the corresponding free bases, conventional techniques may be utilized, e.g., dissolution of the salt in water and precipitation using a base such as sodium carbonate.

The compounds of Formula II may also be illustrated by their tautomeric equivalents such as represented by the following structural formula:

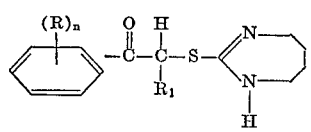

(X)

where $n$, R and the proviso are as previously defined.

In order to simplify this description, however, Formula II only will be used; but it should nevertheless be understood that the compounds of Formula X including the optical isomers, as well as the compounds of Formula II are within the scope of the present invention.

Certain of the starting materials of Formulas III, IV, V, VIa, VIb, VII, VIII, and IX above are known and are prepared by methods disclosed in the literature. Those not specifically disclosed are prepared from known materials in an analogous manner.

The compounds of Formulas I and II are useful because they possess pharmacological activity in animals. More particularly, the compounds possess CNS stimulant activity and are useful as antidepressants as indicated by their activity in mice given parenterally 5 to 50 mg./kg. of body weight of active material. The test method used is basically as described by Spencer, P. S. J., Antagonism of Hypothermia in the Mouse by Antidepressants, in Antidepressant Drugs, pp. 194–204, Eds. S. Garattini and M. N. G. Dukes, Excerpta Medica Foundation, 1967.

The compounds of Formulas I and II are also useful as anoretics as indicated by their activity in rat given 50 mg./kg. of active material and tested by use of the free feeding method described by Randall et al. (J.P.E.T., 129, 163, 1960), whereby 16 groups of six male Wistar rats are deprived of food for 18 hours, but receive water ad libitum. Consumption of ground food is then measured over a four hour period following oral administration of the active compound.

For such use, the compounds (I) or (II) may be combined with a pharmaceutically acceptable carrier of adjuvant, and may be administered orally in such forms as tablets, capsules, elixirs, suspensions and the like, or parenterally in the form of an injectable solution or suspension. The dosage will vary depending upon the mode of administration utilized and the particular compound employed.

These compounds of Formulas I and II may be similarly administered in the form of their non-toxic pharmaceutically acceptable acid addition salts. Such salts possess the same order of activity as the free base, are readily prepared by reacting the base with an appropriate acid and accordingly are included within the scope of the invention. Representative of such salts are the mineral acid salts, such as the hydrochloride, hydrobromide, sulfate, phosphate and the like and the organic acid salts, such as the succinate, benzoate, acetate, p-toluenesulfonate, benzenesulfonate and the like.

In general, satisfactory results for anoretic or antidepressant activity are obtained when the compounds are administered at a daily dosage of from about 0.01 to 50 milligrams per kilogram of animal body weight. This daily dosage is preferably given in divided doses, e.g., 2 to 4 times a day, or in sustained release form. For most large animals, the total daily dosage is from about 0.75 to 100 milligrams and dosage forms suitable for internal administration comprise from about 0.19 to 50 milligrams of the compound in admixture with a solid or liquid pharmaceutical carrier or diluent.

Representative formulations suitable for oral administration are tablets or capsules prepared by standard techniques which contains the following:

| Ingredient | Weight | |
|---|---|---|
| | Tablet | Capsule |
| 3-(4'-chlorophenyl)-3-hydroxy-2,3,5,6,7,8-hexahydro-thiazolo[3,2-a][1,3]diazepine hydrobromide | 10 | 10 |
| Tragacanth | 2 | |
| Lactose | 64.5 | 75 |
| Corn starch | 5 | |
| Talcum | 3 | |
| Magnesium stearate | 0.5 | |

| Ingredient | Weight (mg.) | |
|---|---|---|
| | Tablet | Capsule |
| 3-p-chlorophenyl-5,6,7,8-tetrahydrothiazolo[3,2-a][1,3]diazepine hydrochloride | 25 | 25 |
| Tragacanth | 2 | |
| Lactose | 64.5 | 75 |
| Corn starch | 5 | |
| Talcum | 3 | |
| Magnesium stearate | 0.5 | |

STERILE SUSPENSION FOR INJECTION AND ORAL LIQUID SUSPENSION

The following pharmaceutical compositions are formulated with the indicated amount of active agent using conventional techniques. The injectable suspension and the oral liquid suspension represent formulations useful as unit doses and may be administered in the treatment of depression. The injectable suspension is suitable for administration once a day whereas the oral liquid suspension is suitably administered 2 to 4 times per day for this purpose:

| | Weight (mg.) | |
|---|---|---|
| | Sterile injectable suspension | Oral liquid suspension |
| 3-(4'-chlorophenyl)-3-hydroxy-2,3,5,6,7,8-hexahydro-thiazolo[3,2-a][1,3]diazepine hydrobromide | 10 | 10 |
| Sodium carboxy methyl cellulose, U.S.P. | 1.25 | 12.5 |
| Methyl cellulose | 0.4 | |
| Polyvinylpyrrolidone | 5 | |
| Lecithin | 3 | |
| Benzyl alcohol | 0.01 | |
| Magnesium aluminum silicate | | 47.5 |
| Flavor | | Q.s. |
| Color | | Q.s. |
| Methyl paraben, U.S.P | | 4.5 |
| Propyl paraben, U.S.P | | 1.0 |
| Polysorbate 80 (e.g. Tween 80), U.S.P | | 5 |
| Sorbitol solution, 70% U.S.P | | 2,500 |
| Buff agent to adjust pH for desired stability | Q.s. | Q.s. |
| Water | (1) | (2) |

1 For injection q.s. to 1 ml.
2 Q.s. to 5 ml.

Example 1.—3-phenyl-5,6,7,8-tetrahydro-thiazolo[3,2-a][1,3]diazepine hydrochloride

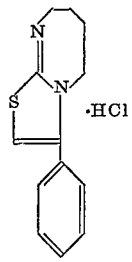

Step 1: 3-hydroxy - 3 - phenyl - 2,3,5,6,7,8 - hexahydro-thiazolo[3,2-a][1,3]diazepine hydrobromide.—A solution of phenacylbromide (20.0 g.) in 150 ml. acetone is added in one portion with stirring to a solution of tetramethylenethiourea (12.5 g.) in acetone (1000 ml.) at room temperature. After stirring for 1.5 hours, 31.1 g. of the resultant product 3-hydroxy - 3 - phenyl-2,3,5,6,7,8 - hexahydro - thiazolo[3,2-a][1,3]diazepine hydrobromide is collected by filtration; M.P. 180°–182° C.

The free base is prepared by suspending the salt in water, adding sodium carbonate, and collecting the resulting solid.

Step 2: 3-phenyl - 5,6,7,8 - tetrahydro - thiazolo[3,2-a][1,3]diazepine hydrochloride.—A mixture of 3 - hydroxy - 3 - phenyl - 2,3,5,6,7,8 - hexahydro - thiazolo-[3,2-a][1,3]diazepine (10 g.), methanol (100 ml.) and concentrated HCl (20 ml.) is refluxed for 15 hours. The resultant solution is evaporated in vacuo. The resultant residue is crystallized from acetone to provide 5.9 g. of 3 - phenyl - 5,6,7,8 - tetrahydro - thiazolo[3,2-a][1,3]diazepine hydrochloride; M.P. 94°–96° C.

Example 2.—3-p-chlorophenyl-5,6,7,8-tetrahydro-thiazolo[3,2-a][1,3]diazepine hydrochloride

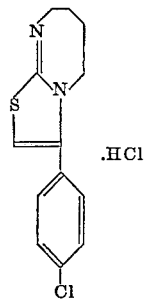

Step 1: 3 - p - chlorophenyl - 3 - hydroxy - 2,3,5,6,7,8-hexahydro-thiazolo[3,2-a][1,3]diazepine hydrobromide.—A solution of p-chlorophenacylbromide (35.5 g.) in 180 ml. acetone is added in one portion with stirring to a solution of tetramethylenethiourea (18.75 g.) in acetone (1000 ml.) at room temperature. After stirring for 1.5 hours, 50 g. of the resultant product 3-p-chlorophenyl-3-hydroxy - 2,3,5,6,7,8 - hexahydro-thiazolo[3,2-a][1,3]diazepine hydrobromide is collected by filtration; M.P. 193°–194° C.

The free base is prepared by suspending the salt in water, adding sodium carbonate, and collecting the resulting solid.

Step 2: 3 - p - chlorophenyl-5,6,7,8-tetrahydro-thiazolo[3,2-a][1,3]diazepine hydrochloride.—A mixture of 3-p-chlorophenyl - 3 - hydroxy-2,3,5,6,7,8-hexahydrothiazolo[3,2-a][1,3]diazepine (9.0 g.), methanol (200 ml.), and concentrated HCl (40 ml.) is refluxed for 18 hours. The resultant solution is evaporated in vacuo. The resultant residue is crystallized from acetone to provide 6.0 g. of 3 - p-chlorophenyl-5,6,7,8-tetrahydro-thiazolo[3,2-a][1,3]diazepine hydrocloride; M.P. 206°–207° C.

Example 3.—3 - p-methoxyphenyl-5,6,7,8-hexahydro-thiazolo[3,2-a][1,3]diazepine hydrochloride

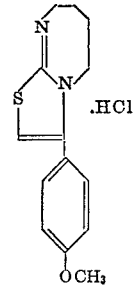

Step 1: 3 - hydroxy-3-p-methoxyphenyl-2,3,5,6,7,8-hexahydro - thiazolo[3,2-a][1,3]diazepine hydrobromide.—A solution of p-methoxyphenacylbromide (23.1 g.) in 160 ml. acetone is added in one portion with stirring to a solution of tetramethylenethiourea (12.5 g.) in acetone (1000 ml.) at room temperature. After stirring for 15 hours, 10 g. of the resultant product 3-hydroxy-3-p-methoxyphenyl - 2,3,5,6,7,8-hexahydro-thiazolo[3,2-a][1,3]diazepine hydrobromide is collected by filtration, M.P. 164°–165° C. with decomposition.

Step 2: 3-p-methoxyphenyl-5,6,7,8-tetrahydro-thiazolo[3,2-a][1,3]diazepine hydrochloride.—A mixture of 3-hydroxy - 3 - p-methoxyphenyl-2,3,5,6,7,8-hexahydrothiazolo[3,2-a][1,3]diazepine hydrobromide (9.0 g.) in ethanol (200 ml.) is refluxed for 18 hours after which the mixture is evaporated in vacuo. The resultant residue is crystallized from acetone to provide 3 - p - methoxyphenyl 5,6,7,8 - tetrahydro-thiazolo[3,2-a][1,3]diazepine hydrochloride.

Example 4.—3 - (4 - biphenyl)-5,6,7,8-tetrahydro-thiazolo[3,2-a][1,3]diazepine hydrochloride

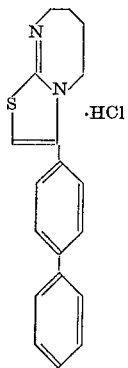

Step 1: 3-hydroxy-3-(4-biphenyl)-2,3,5,6,7,8-hexahydro-[3,2-a][1,3]diazepine hydrobromide.—A solution of p-phenylphenacylbromide (6.8 g.) in 50 ml. acetone is added in one portion with stirring to a solution of tetramethylenethiourea (3.12 g.) in acetone (250 ml.) at room temperature. After stirring for 18 hours, 9.1 g. of the resultant product 3-hydroxy-3-(4-biphenylyl)-2,3,5,6,7,8-hexahydro-thiazolo[3,2-a][1,3]diazepine hydrobromide is collected by filtration; M.P. 237–238° C.

The free base is prepared by suspending the salt in water, adding sodium carbonate, and collecting the resulting solid.

Step 2: 3 - (4-biphenylyl)-5,6,7,8-tetrahydro-thiazolo[3,2-a][1,3]diazepine hydrochloride.—A mixture of 3-hydroxy - 3 - (4-biphenylyl)-2,3,5,6,7,8-hexahydro-thiazolo[2,3-a][1,3]diazepine (5.0 g.), methanol (200 ml.) and concentrated HCl (40 ml.) is refluxed for 40 hours. The resultant solution is evaporated in vacuo. The resultant residue is crystallized from acetone to provide to 4.0 g. of 3 - (4-biphenylyl)-5,6,7,8-tetrahydro-thiazolo[3,2-a][1,3]diazepine hydrochloride M.P. 253 to 254° C. with decomposition.

Example 5.—3-(m-trifluoromethylphenyl)-5,6,7,8-tetrahydrothiazolo[3,2-a][1,3]diazepine hydrochloride.

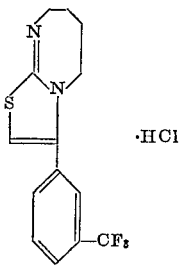

Step 1: 3-hydroxy-3-(m-trifluoromethylphenyl)-2,3,5,6,7,8 - hexahydrothiazolo[3,2-a][1,3]diazepine hydrobromide.—A solution of m-trifluorophenacyl bromide (7.13 g.) in 50 ml. acetone is added in one portion with stirring to a solution of tetramethylenethiourea (3.25 g.) in acetone (200 ml.) at room temperature. After stirring for 48 hours, 4.4 g. of the resultant product 3-hydroxy-3-(m-trifluoromethylphenyl) - 2,3,5,6,7,8 - hexahydrothiazolo[3,2-a][1,3]diazepine hydrobromide is collected by filtration; M.P. 186–188° C.

The free base is prepared by suspending the salt in water, adding sodium carbonate, and collecting the resulting solid.

Step 2: 3(m-trifluoromethylphenyl)-5,6,7,8-tetrahydrothiazolo[3,2-a][1,3]diazepine hydrochloride.—A mixture of 3-hydroxy-3 - (m-trifluoromethylphenyl) - 2,3,5,6,7,8-hexahydro-thiazolo[3,2-a][1,3]diazepine (2.0 g.), methanol (100 ml.) and concentrated HCl (20 ml.) is refluxed for 24 hours. The resultant solution is evaporated in vacuo. The resultant residue is crystallized from acetone to provide 1.8 g. of 3(m-trifluoromethylphenyl)-5,6, 7,8 - tetrahydro - thiazolo[3,2 - a][1,3]diazepine hydrochloride; M.P. 198° to 199° C.

Example 6.—3-(3,4-dichlorophenyl)-5,6,7,8-tetrahydrothiazolo[3,2-a][1,3]diazepine hydrochloride Step 1: 3-hydroxy-3-(3,4-dichlorophenyl)-2,3,5,6,7,8-hexahydro[3,2-a][1,3]diazepine hydrobromide.—Following the procedure of Step 1, Example 1, but using an equivalent amount of 3,4-dichlorophenacyl bromide in place of the phenacyl bromide used therein, there is obtained 3-hydroxy-3 - (3,4-dichlorophenyl) - 2,3,5,6,7,8-hexahydro-thiazolo [3,2-a][1,3]diazepine, in the form of its hydrobromide.

The free base form of this product is prepared by suspending the salt form in water, adding sodium carbonate and collecting the resulting solid.

Step 2: 3-(3,4-dichlorophenyl)-5,6,7,8-tetrahydro-thiazole[3,2-a][1,3]diazepine.—Following essentially the same procedure as in Step 2, Example 1, using an equivalent weight of 3-hydroxy-3-(3,4-dichlorophenyl)-2,3,5,6, 7,8-hexahydro-thiazolo[3,2-a][1,3]diazepine in place of the 3-hydroxy-3 - phenyl - 2,3,5,6,7,8 - hexahydro-thiazolo [3,2-a][1,3]-diazepine used therein, there is obtained 3-(3,4-dichlorophenyl)-5,6,7,8-tetrahydro-thiazolo [3,2 - a] [1,3]diazepine, in the form of its hydrochloride.

Example 7.—3-hydroxy-3-phenyl-2,3,5,6,7,8-hexahydro-thiazolo[3,2-a][1,3]diazepine A solution of 0.10 mole of 2,3,5,6,7,8-hexahydro-3-oxo-1,3-diazepine[2,1-b]thiazole in 500 ml. of anhydrous tetrahydrofuran is added dropwise over 2 hours, at room temperature, to a stirred solution of 0.11 mole of phenyllithium in 500 ml. of tetrahydrofuran maintained under nitrogen atmosphere.

The mixture is stirred overnight at room temperature, cooled in an ice bath and treated with 50 ml. of saturated ammonium chloride solution. The solids are filtered off and the filtrate is dried with magnesium sulphate. The solution is then treated with a stream of hydrogen bromide gas to give 3-hydroxy-3-phenyl - 2,3,5,6,7,8 - hexahydro-thiazolo[3,2-a][1,3]diazepine in the form of its hydrobromide; M.P. 180–182°.

The title product is also obtained when an equivalent amount of magnesium bromide is substituted for the phenyllithium in the above process.

When the above is carried out using instead of the phenyllithium or phenyl magnesium bromide an equivalent amount of (a) p-chlorophenyllithium or p-chlorophenyl magnesium bromide,
(b) p-methoxyphenyllithium or p-methoxyphenyl magnesium bromide,
(c) p-biphenyllithium or p-biphenylyl magnesium bromide,
(d) m-trifluoromethylphenyllithium or m-trifluoromethylphenyl magnesium bromide or
(e) 3,4-dichlorophenyllithium or 3,4-dichlorophenyl-magnesium bromide.

there is obtained (a) 3-p-chlorophenyl-3-hydroxy-2,3,5,6,7,8-hexahydro-[3,2-a][1,3]diazepine, in the form of its hydrobromide; M.P. 164–194°,
(b) 3-hydroxy-3-p-methoxyphenyl-2,3,5,6,7,8-hexahydro-thiazolo[3,2-a][1,3]diazepine, in the form of its hydrobromide; M.P. 164–165°,
(c) 3-hydroxy - 3 - (4-biphenylyl)-2,3,5,6,7,8-hexahydro-thiazolo[3,2-a][1,3]diazepine in the form of its hydrobromide; M.P. 237–238°,
(d) 3-hydroxy-3-(m-trifluoromethylphenyl)-2,3,5,6,7,8-hexahydrothiazolo[3,2-a][1,3]diazepine, in the form of its hydrobromide; M.P. 186–188° or,
(e) 3-hydroxy-3-(3,4-dichlorophenyl)-2,3,5,6,7,8-hexahydro-thiazolo-[3,2-a][1,3]diazepine in the form of its hydrobromide.

Example 8.—3-hydroxy-3-phenyl-2,3,5,6,7,8-hexahydro-thiazolo[3,2-a][1,3]diazepine A mixture of 0.10 mole of 2-bromoacetophenone, 0.20 mole of sodium hydrosulphide and 200 ml. of anhydrous dimethyl formamide is stirred at room temperature for 24 hours. The solvent is removed in vacuo and the residue is then treated with 50 ml. of water and 200 ml. of chloroform. The chloroform is separated from water layer, dried with magnesium sulphate, filtered and concentrated in vacuo to give 2-mercaptoacetophenone. The crude ketone is added to 0.10 mole of 2-bromo-4,5,6,7-tetrahydro-1H-1,3-diazepine in 150 ml. of isopropanol, and the solution is stirred at room temperature for 24 hours. The solid which precipitates is filtered off yielding the title product, in the form of its hydrobromide; M.P. 180–182°.

Carrying out the above procedure, but replacing the 2-bromoacetophenone, used therein, with an equivalent amount of (a) 2-bromo-4'-chloroacetophenone,
(b) 2-bromo-4'-methoxyacetophenone,
(c) 2-bromo-4'-phenylacetophenone,
(d) 2-bromo-3'-trifluoromethylacetophenone, or there is obtained (a) 3-p-chlorophenyl-3-hydroxy-2,3,5,6,7,8-hexahydro-thiazolo[3,2-a][1,3]diazepine, in the form of its hydrobromide; M.P. 193–194°,
(b) 3-hydroxy-3-p-methoxyphenyl-2,3,5,6,7,8-hexahydro-thiazolo[3,2-a][1,3]diazepine in the form of its hydrobromide; M.P. 164–165°,
(c) 3-hydroxy-3-(4-biphenyl)-2,3,5,6,7,8-hexahydro-thiazolo[3,2-a][1,3]diazepine, in the form of its hydrobromide; M.P. 237–238°,
(d) 3-hydroxy-3-(m-trifluoromethylphenyl)-2,3,5,6,7,8-hexahydro-thiazolo[3,2-a][1,3]diazepine in the form of its hydrobromide M.P. 186–188° or
(e) 3-hydroxy-3-(3,4-dichlorophenyl)-2,3,5,6,7,8-hexahydro-thiazolo[3,2-a][1,3]diazepine in the form of its hydrobromide.

Example 9.—3-hydroxy-3-phenyl-2,3,5,6,7,8-hexahydro-thiazolo[3,2-a][1,3]diazepine The compound, 2 - [2 - phenyl - 2 - hydroxyethylthio-4,5,6,7-tetrahydro-1H-1,3-diazepine (5 g.), is dissolved in 250 ml. of methylene chloride; and to the solution is added 50 g. of activated manganese dioxide. The mixture is stirred at room temperature for 32 hours, after which manganese salts are filtered off and the filtrate concentrated in vacuo. The residue is crystallized from methanol to yield the title product, in the form of its hydrobromide; M.P. 180–182°.

By repeating the above procedure, and replacing the 2-[2-phenyl-2 - hydroxyethylthio] - 4,5,6,7 - tetrahydro-1H-1,3-diazepine used therein, with an equivalent amount of (a) 2-[2-(p-chlorophenyl)-2-hydroxyethylthio] - 4,5,6,7-tetrahydro-1H-1,3-diazepine,
(b) 2-[2-(p-methoxyphenyl)-2-hydroxyethylthio]-4,5,6,7-tetrahydro-1H-1,3-diazepine,
(c) 2-[2-(p-diphenylyl)-2-hydroxyethylthio]-4,5,6,7-tetrahydro-1H-1,3-diazepine,
(d) 2-[2-(m-trifluoromethylphenyl)-2-hydroxyethylthio]-4,5,6,7-tetrahydro-1H-1,3-diazepine or
(e) 2-[2-(3,4-dichlorophenyl)-2-hydroxyethylthio]-4,5,6,7-tetrahydro-1H-1,3-diazepine,
there is obtained:

(a) 3-p-chlorophenyl-3-hydroxy-2,3,5,6,7,8-hexahydro-thiazolo[3,2-a][1,3]diazepine, in the form of its hydrobromide; M.P. 193–194°,
(b) 3-hydroxy-3-p-methoxyphenyl-2,3,5,6,7,8-hexahydro-thiazolo[3,2-a][1,3]diazepine, in the form of its hydrobromide; M.P. 164–165°,
(c) 3-hydroxy-3-(4-biphenylyl)-2,3,5,6,7,8-hexahydro-thiazolo[3,2-a][1,3]diazepine in the form of its hydrobromide; M.P. 237–238°,
(d) 3-hydroxy-3-(m-trifluoromethylphenyl)-2,3,5,6,7,8-hexahydro-thiazolo[3,2-a][1,3]diazepine in the form of its hydrobromide; M.P. 237–238° or
(e) 3-hydroxy-3-(3,4-dichlorophenyl)-2,3,5,6,7,8-hexahydrothiazolo[3,2-a][1,3]diazepine in the form of its hydrobromide.

What is claimed is:

1. A compound of the formula

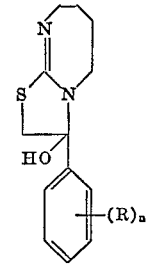

where $n$ is 0, 1 or 2 and
R is fluoro, chloro, phenyl, trifluoromethyl or lower alkoxy provided trifluoromethyl groups are not or adjacent carbon atoms, or a pharmaceutically acceptable acid addition salt thereof.

2. The compound of claim 1 which is 3-hydroxy-3-phenyl-2,3,5,6,7,8 - hexahydro - thiazolo[3,2 - a][1,3] diazepine.

3. The compound of claim 1 which is 3-p-chlorophenyl-3 - hydroxy - 2,3,5,6,7,8 - hexahydro-thiazol[3,2-a][1,3] diazepine.

4. The compound of claim 1 which is 3-p-methoxyphenyl - 3 - hydroxy - 2,3,5,6,7,8 - hexahydro - thiazolo [3,2-a][1,3]diazepine.

5. The compound of claim 1 which is 3-hydroxy-3-(4-biphenylyl) - 2,3,5,6,7,8 - hexahydro-thiazolo[3,2-a][1,3] diazepine.

6. The compound of claim 1 which is 3-hydroxy-3-(m-trifluoromethylphenyl) - 2,3,5,6,7,8 - hexahydro-thiazolo [3,2-a][1,3]diazepine.

7. The compound of claim 1 which is 3-hydroxy-3-(3,4-dichlorophenyl) - 2,3,5,6,7,8 - hexahydro-thiazolo [3,2-a][1,3]diazepine.

References Cited

UNITED STATES PATENTS 3,169,970    2/1965    Snyder _____ 260—306.8

OTHER REFERENCES

Chada et al.: Aust. J. Chem., 1969, 22(12), 2697–701.
Fefer et al.: J. Org. Chem., 26, 828–35 (1961).

RICHARD J. GALLAGHER, Primary Examiner

U.S. Cl. X.R.

260—306.7, 592; 424—80, 270